UNITED STATES PATENT OFFICE.

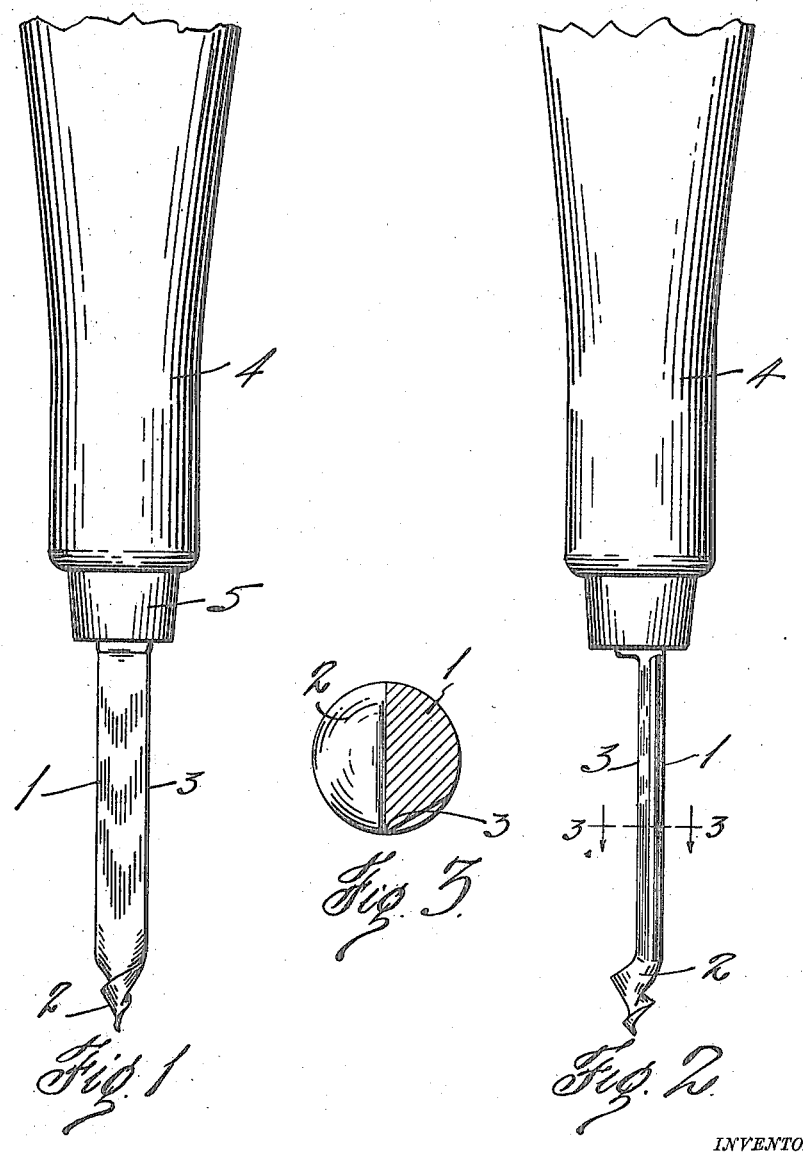

LUCA PATERNOSTRO, OF DALLAS, TEXAS.

SHOEMAKER'S GIMLET.

1,263,698.  Specification of Letters Patent.  Patented Apr. 23, 1918.

Application filed August 14, 1917.  Serial No. 186,099.

*To all whom it may concern:*

Be it known that I, LUCA PATERNOSTRO, a citizen of the United States, residing at Dallas, in the county of Dallas and State of Texas, have invented certain new and useful Improvements in Shoemakers' Gimlets, of which the following is a specification.

This invention has particular relation to shoemakers' gimlets and is especially designed for boring holes in heels for the nails which hold on rubber heels.

As is well known heels of women's shoes are to a large extent made of wood and covered with leather or other material. This is particularly true with French heels. The French heel has a contracted portion just above the tread and in applying rubber heels the wooden heel is often split owing to the nails entering the contracted portion. However with all wooden heels splitting is frequent, so much so that some shoemakers refuse to undertake to put on rubber heels.

I have designed a tool in the nature of a gimlet with which I am able to bore holes in any style of wooden heels and particularly French heels. It is possible to bore the holes in juxta-position and to make them at an angle to the perpendicular if desired. The holes are made so as to properly receive the nails which may be quickly driven into the wooden heels without splitting the same.

In carrying out the invention a shank is provided and formed at its lower end with an auger-point. The shank exhibits a semicircular shape in cross-section and has one vertical edge reduced to form a cutting blade which scrapes the side of the hole as it is bored.

The invention will be more readily understood from a perusal of the following specification and by reference to the accompanying drawing, in which an example of the invention is illustrated and wherein:

Figure 1 is an elevation of the tool,

Fig. 2 is a similar view at right angles to the position shown in Fig. 1, and

Fig. 3 is a cross-sectional view taken on the line 3—3 of Fig. 2.

In the drawing the numeral 1 designates an elongated shank terminating at its lower end in an auger-point 2 of such configuration as to readily enter a wooden heel and lead the shank. As an example a tool less than an inch in length from the upper end of the shank to the tip of the auger has been found very efficient. One edge of the semicircular shank above the point 2 is reduced at 3 to form a knife or cutting blade which is quite essential to the success of the tool.

As shown in Fig. 3 the auger-point has a transverse area substantially circular, while the shank has a semicircular area within the area of the point. When the point is driven into a heel by means of a suitable handle 4 to which the shank is secured and by an oscillating motion, it bores a circular hole. The cutting edge 3 of the shank scrapes the sides of the hole and completes the cutting. The semicircular shank provides a self-cleaning feature as it leaves substantially one half the area of the hole for the escape of matter cut in boring the said hole.

In using the tool the rubber heel is positioned on the wooden and used as a templet. The point of the gimlet is inserted in one of the holes of the rubber heel and the hole is bored in the wooden heel. A ferrule 5 on the lower end of the handle may be used as a stop for limiting the depth of the bore, the shank having such a length that when the ferrule impinges the upper surface of the rubber heel the proper depth will have been reached. After the holes have been bored the nails are driven into the heels and the job completed in the usual way. The operation is quick and a clean hole is made.

What I claim is:

A shoemaker's gimlet, comprising a non-tapering shank which is semi-circular in cross-section, said shank having its material cut away longitudinally upon the trailing side of one edge thereof, to provide a sharp cutting edge extending for substantially the entire length of said shank; and a tapered auger-point formed upon the lower end of the shank, including a plurality of turns, which decrease in diameter downwardly, the upper large turn being circular in cross-section, and receiving within its circumference, the semi-circular cross-sectional area of the shank.

In testimony whereof I affix my signature.

LUCA PATERNOSTRO.